(12) United States Patent  
Kuzuhara et al.

(10) Patent No.: US 12,007,557 B2
(45) Date of Patent: Jun. 11, 2024

(54) OPTICAL SYSTEM

(71) Applicant: Panasonic Intellectual Property Management Co., Ltd., Osaka (JP)

(72) Inventors: Satoshi Kuzuhara, Osaka (JP); Tsuneo Uchida, Chiba (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 501 days.

(21) Appl. No.: 17/398,135

(22) Filed: Aug. 10, 2021

(65) Prior Publication Data

US 2021/0364784 A1 Nov. 25, 2021

Related U.S. Application Data

(63) Continuation of application No. PCT/JP2020/016171, filed on Apr. 10, 2020.

(30) Foreign Application Priority Data

Apr. 26, 2019 (JP) ................................ 2019-086433

(51) Int. Cl.
*G02B 26/08* (2006.01)
*G02B 26/10* (2006.01)
(Continued)

(52) U.S. Cl.
CPC ........ *G02B 26/108* (2013.01); *G02B 26/101* (2013.01); *G02B 27/0081* (2013.01); *G02B 5/04* (2013.01)

(58) Field of Classification Search
CPC .......................... G02B 26/108; G02B 26/101; G02B 27/0081; G02B 5/04; G02B 17/0816; G02B 17/086; G02B 26/08
See application file for complete search history.

(56) References Cited

U.S. PATENT DOCUMENTS

2012/0307328 A1* 12/2012 Kessler ................ G02B 26/105
359/729
2015/0216408 A1 8/2015 Brown et al.
2019/0324265 A1* 10/2019 Milanovic .......... G02B 27/0172

FOREIGN PATENT DOCUMENTS

JP 2018-108400 7/2018

OTHER PUBLICATIONS

International Search Report dated Jul. 14, 2020 in International (PCT) Application No. PCT/JP2020/016171 with English translation.

(Continued)

*Primary Examiner* — Euncha P Cherry
(74) *Attorney, Agent, or Firm* — Wenderoth, Lind & Ponack, L.L.P.

(57) ABSTRACT

The present disclosure provides an optical system that includes a prism having an incident surface, an exit surface, and one or more reflecting surfaces. The optical system includes a first scanning element configured to scan a light that enters and has a plurality of wavelengths in a first direction, and reflect the light in a direction of the incident surface of the prism. The optical system includes a second scanning element configured to scan in a second direction the light that exits from the exit surface of the prism, the second direction being orthogonal to the first direction. The incident surface of the prism has a concave shape with respect to the first scanning element.

21 Claims, 7 Drawing Sheets

(51) Int. Cl.
*G02B 27/00* (2006.01)
*G02B 5/04* (2006.01)

(56) References Cited

OTHER PUBLICATIONS

International Preliminary Report on Patentability dated Sep. 28, 2021 in International (PCT) Application No. PCT/JP2020/016171.

\* cited by examiner

OPTICAL SYSTEM

CROSS-REFERENCE TO RELATED APPLICATIONS

This is a continuation application of International Application No. PCT/JP2020/016171, with an international filing date of Apr. 10, 2020, which claims priority of Japanese Patent Application No. 2019-086433 filed on Apr. 26, 2019, the content of which is incorporated herein by reference.

TECHNICAL FIELD

The present disclosure relates to an optical system using a prism.

BACKGROUND

JP 2018-108400 A discloses an optical system having a scanning device that scans in two directions. It is described that this optical system transmits a scanned laser using a mirror. When the laser is transmitted using the mirror, since there is a layer of air between mirrors, it is difficult to reduce the size of the optical system.

SUMMARY

When a apace between mirrors is filled with medium of prism, in order to downsize an optical system, chromatic aberration may occur in the prism.

The present disclosure provides an optical system capable of reducing chromatic aberration generated in the prism.

An optical system according to the present disclosure includes a prism having an incident surface, an exit surface, and one or more reflecting surfaces, a first scanning element that scans an incident light having a plurality of wavelengths in a first direction and reflects the light in a direction of the incident surface of the prism, and a second scanning element that scans the light exiting from the exit surface of the prism in a second direction orthogonal to the first direction. The incident surface of the prism has a concave shape with respect to the first scanning element.

An optical system according to the present disclosure includes a prism having an incident surface, an exit surface, and one or more reflecting surfaces, a first scanning element that scans an incident light having a plurality of wavelengths in a first direction and reflects the light in a direction of the incident surface of the prism, and a second scanning element that scans the light exiting from the exit surface of the prism in a second direction orthogonal to the first direction. The exit surface of the prism has a concave shape with respect to the second scanning element.

An optical system of the present disclosure can reduce chromatic aberration generated in the prism.

DETAILED DESCRIPTION

Hereinafter, embodiments will be described in detail with reference to the drawings as appropriate. However, unnecessarily detailed description may be omitted. For example, a detailed description of a well-known matter and a repeated description of substantially the same configuration may be omitted. This is to avoid unnecessary redundancy in the following description and to facilitate understanding of those skilled in the art.

Note that the inventor(s) provides the accompanying drawings and the following description in order for those skilled in the art to fully understand the present disclosure, and does not intend to limit the subject matter described in the claims by the accompanying drawings and the following description.

First Embodiment

The first embodiment will be described below with reference to FIGS. 1 to 9. In the present embodiment, as illustrated in FIG. 2, for example, an X direction is a long diameter direction of a pupil diameter 11a of a laser light R emitted from a laser element 11, and a Y direction is a short diameter direction of the pupil diameter 11a of the laser light R emitted from the laser element 11. The X direction and the Y direction are orthogonal to each other, and a direction orthogonal to an XY plane is a Z direction.

1-1. Configuration

Figure 1:
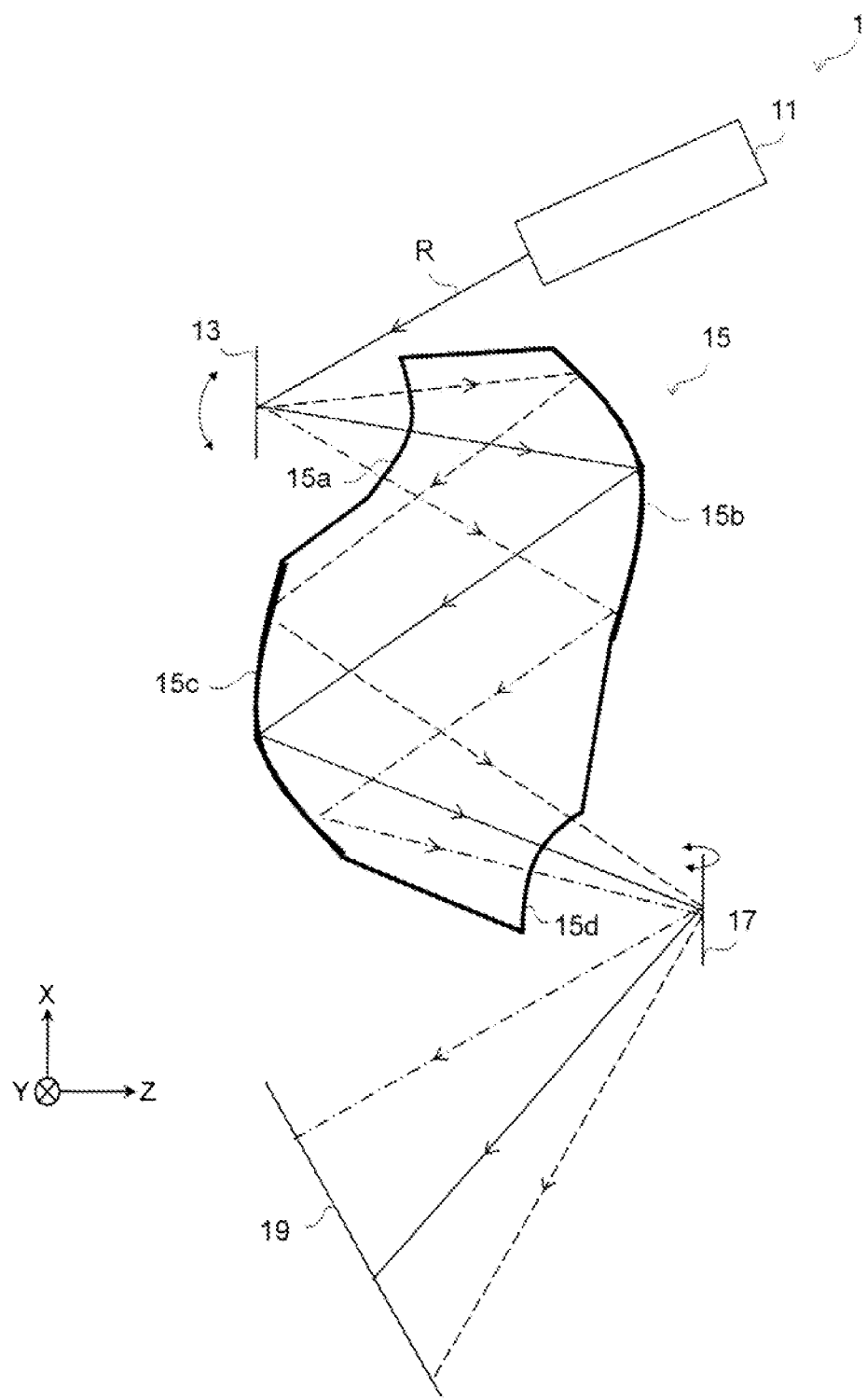
FIG. 1 is a cross-sectional view illustrating a configuration of an optical system according to a first embodiment.
Figure 2:
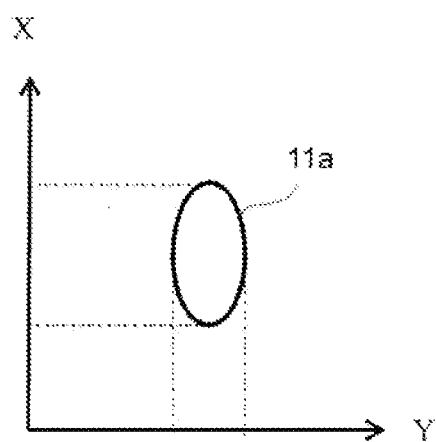
FIG. 2 is a diagram illustrating a pupil diameter of a laser light immediately after irradiation from a laser element in the first embodiment.

FIG. 1 is a cross-sectional view illustrating a configuration of an optical system 1 according to the present disclosure. The optical system 1 includes a laser element 11, a first scanning element 13, a prism 15, and a second scanning element 17.

The laser element 11 is, for example, a semiconductor laser. The laser light R emitted from the laser element 11 is a parallel light having different pupil diameters in the X direction and the Y direction. For example, as illustrated in FIG. 2, the pupil diameter 11a of a laser light R immediately after irradiation from the laser element 11 has an elliptical shape extending in the X direction. The laser light R emitted from the laser element 11 is scanned in the X direction by the first scanning element 13 and is incident on an incident surface 15a of the prism 15. The laser light R has a plurality of wavelengths or wavelength regions so as to have, for example, colors of red (R), green (G), and blue (B). The laser element 11 may emit one light flux in which R, G, and B lights are mixed as the laser light R, or may sequentially emit the laser light R of a light flux in a wavelength region of each color.

As illustrated in FIG. 1, the first scanning element 13 scans the incident laser light R in the X direction as the first, direction. The first scanning element 13 is, for example, a mirror that is rotationally driven by piezoelectric driving in the Y direction as a rotation axis. The first scanning element 13 is, for example, a scanner in a vertical direction. As a result, the parallel light is diffused in the X direction.

The prism 15 has the incident surface 15a and an exit surface 15d. The prism 15 further has one or more reflecting surfaces in an optical path from the incident surface 15a to the exit surface 15d. In the present embodiment, for example, the prism 15 has a first reflecting surface 15b and a second reflecting surface 15c. The prism 15 is made of, for example, resin or glass.

The incident surface 15a faces the first scanning element 13, and the laser light R scanned in the X direction by the first scanning element 13 is incident on the prism 15 through the incident surface 15a. The incident surface 15a and the first reflecting surface 15b face each other, and the laser light R incident from the incident surface 15a is reflected by the first reflecting surface 15b into the prism 15.

Figure 3:
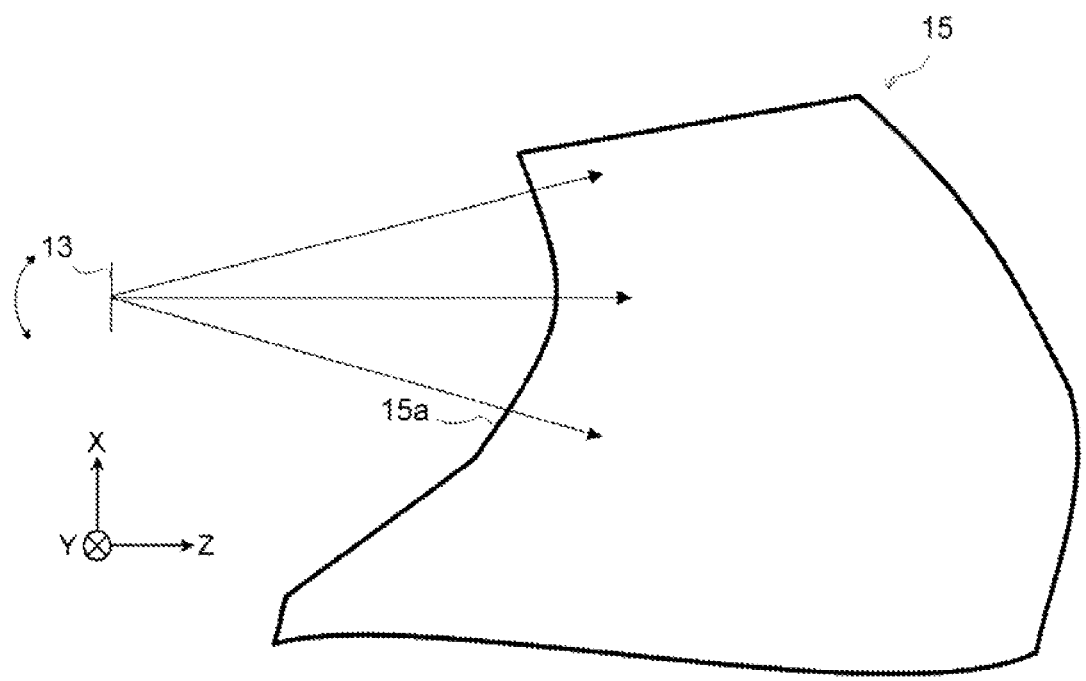
FIG. 3 is an enlarged cross-sectional view of an incident surface of a prism.

As illustrated in FIG. 3, the incident surface 15a has a concave shape with respect to the first scanning element 13. The incident surface 15a has a curved surface shape having a curvature along the X direction in which the first scanning element 13 scans, and is recessed in the internal direction of the prism 15.

In addition, the incident surface 25a may be a rotationally asymmetric surface having a concave shape with respect to the scanning direction of the first scanning element 13. In this manner, by bringing the shape of the incident surface 15a close to the aplanatic surface, chromatic aberration that occurs on the incident surface 15a can be reduced.

In particular, when a curvature radius r of the incident surface 15a is the same as a distance from the first scanning element 13 to the incident surface 15a, the laser light R is vertically incident on the incident surface 15a, so that chromatic aberration does not occur on the incident surface 15a.

The incident surface 15a may have a smaller refractive power in the non-scanning direction than in the scanning direction of the first scanning element 13.

The laser light R reflected by the first reflecting surface 15b is reflected again into the prism 15 by the second reflecting surface 15c disposed facing the exit surface 15d. The laser light R reflected by the second reflecting surface 15c travels to the exit surface 15d and exits from the exit surface 15d to the outside of the prism 15.

The first reflecting surface 15b and the second reflecting surface 15c have different curvatures in the X direction as the first direction and the Y direction as a second direction, respectively. Therefore, the first reflecting surface 15b and the second reflecting surface 15c have a free-form surface shape.

Still more, each of the first reflecting surface 15b and the second reflecting surface 15c may be eccentric to the incident light. This makes it possible to separate the optical path of the incident light without using an optical element such as a beam splitter. Further, each of the first reflecting surface 15b and the second reflecting surface 15c has a concave shape with respect to the incident light.

Figure 4:
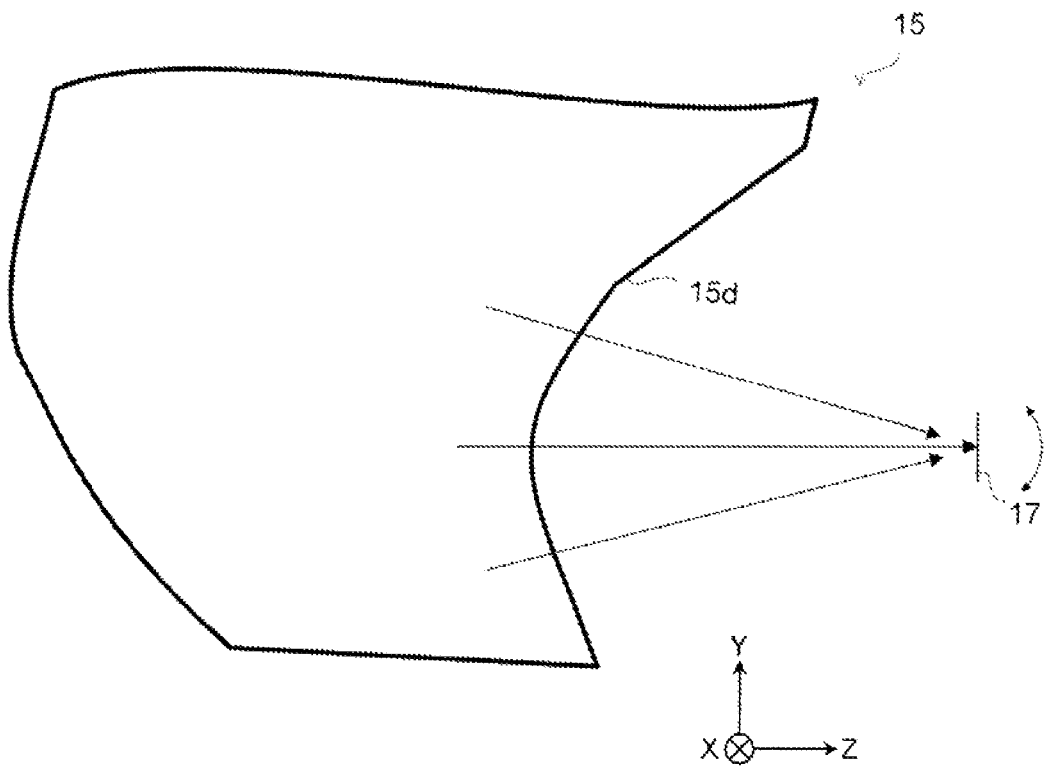
FIG. 4 is an enlarged cross-sectional view of an exit surface of the prism.

The exit surface 15d of the prism 15 may also have the same configuration as the incident surface 15a. The exit surface 15d may have as a concave shape with respect to the second scanning element 17. As illustrated in FIG. 4, for example, the exit surface 15d has a curvature in the Y direction in which the second scanning element 17 scans, and has a recess in the internal direction of the prism 15.

In addition, the exit surface 15d may be a rotationally asymmetric surface having a concave shape with respect to the scanning direction of the second scanning element 17. In this manner, by bringing the shape of the exit surface 15d close to the aplanatic surface, chromatic aberration that occurs on the exit surface 15d can be reduced.

Further, the exit surface 15d may have a smaller refractive power in the non-scanning direction than in the scanning direction of the second scanning element 17.

The second scanning element 17 scans the laser light R exiting from the exit surface 15d of the prism 15 in the Y direction and projects the laser light R onto the projection surface 19. The second scanning element 17 is, for example, a mirror that is rotationally driven by piezoelectric driving in the X direction as a rotation axis. The second scanning element 17 is, for example, a horizontal scanner. In addition, the second scanning element 17 scans in synchronization with the first scanning element 13, so that a two-dimensional image can be projected on the projection sur face 19.

In the optical system 1 according to the present embodiment, the first scanning element 13, the incident surface 15a of the prism 15, the first reflecting surface 15b of the prism 15, the second reflecting surface 15c of the prism 15, the exit surface 15d of the prism 15, and the second scanning element 17 are arranged in order of the optical path from the laser element 11. Therefore, the prism 15 is disposed in the optical path from first scanning element 13 to second scanning element 17.

Figure 5:
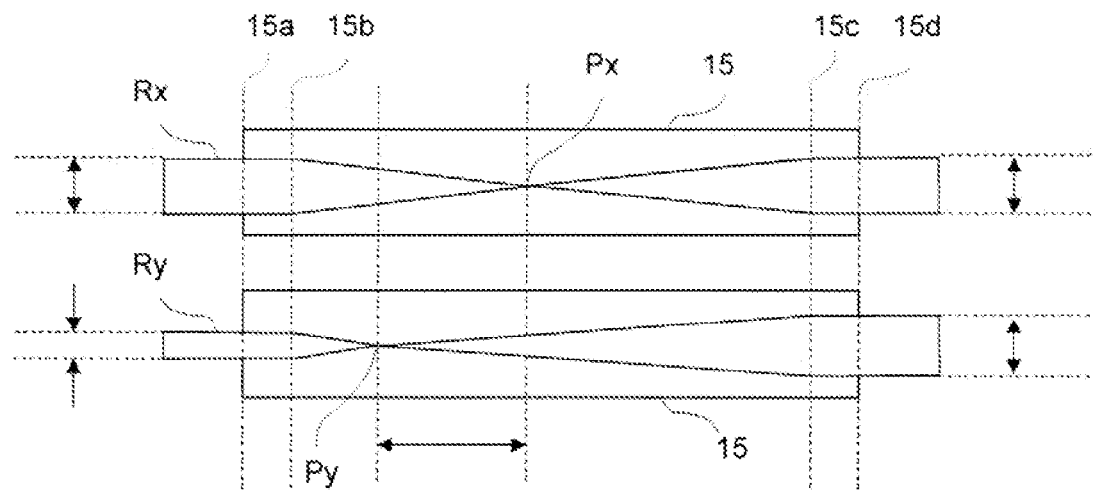
FIG. 5 is a diagram illustrating intermediate imaging positions of an X component and a Y component of the laser light.

As illustrated in FIG. 5, the optical system 1 has an intermediate imaging position Px in the X direction of the light flux of the laser light R between the first scanning element 13 and the second scanning element 17 or between the first reflecting surface 15b in the prism 15 and the second reflecting surface 15c in the prism 15.

Still more, since focal, lengths of Rx that is a component of the laser light R in the X direction, and Ry that is a component of the laser light R in the Y direction are also different, the intermediate imaging position Px of the X component Rx and the intermediate imaging position Py of the Y component Ry of the laser light R are different. Further, since focal lengths of the X component Rx and the Y component Ry are different from each other, magnification ratios at the time of emission from the exit surface 15d of the prism 15 are also different from each other. In other words, the optical system 1 has different optical magnifications in the X direction and the Y direction. For example, in the present embodiment, since the focal length in the Y direction is longer then that in the X direction, the optical magnification in the Y direction is larger than that in the X direction.

Figure 6:
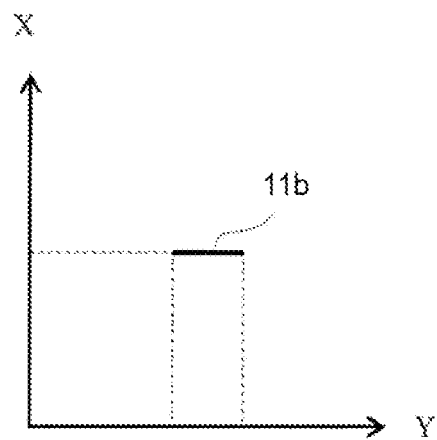
FIG. 6 is a diagram illustrating a pupil diameter of the laser light at an intermediate imaging position (Px).

The intermediate imaging position Px of the light flux of the laser light R in the X direction does not intersect at the same position with the light flux of the laser light R in the Y direction orthogonal to the X direction. In other words, the intermediate imaging position Px of the X component Rx of the laser light R is not located at the same position as the intermediate imaging position Py of the Y component Ry of the laser light R. Therefore, as illustrated in FIG. 6, a pupil diameter 11b f the laser light R at the intermediate imaging position Px has a linear shape extending in the Y direction. As a result, it is possible to prevent loss of the pupil diameter lib of the laser light R when dust or scratch exists at the intermediate imaging position Px.

Figure 7:
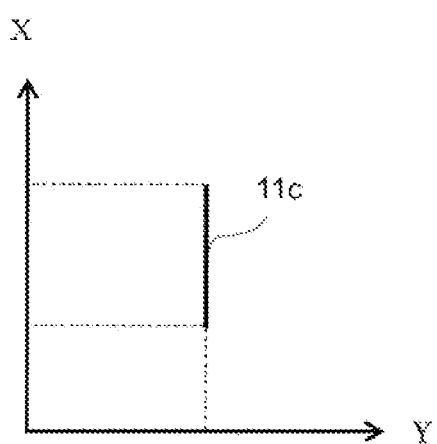
FIG. 7 is a diagram illustrating a pupil diameter of the laser light at an Intermediate imaging position (Py).
Figure 8:
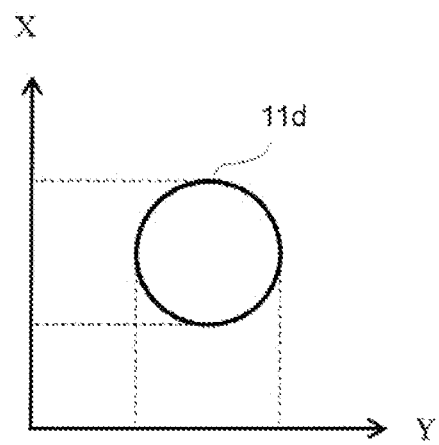
FIG. 8 is a diagram illustrating a pupil diameter of the laser light exiting the prism.

Further, as illustrated in FIG. 7, at the intermediate imaging position Py of the Y component Ry of the laser light R, a pupil diameter 11c of the laser light R exists before the X component Rx of the laser light R forms an image. In this manner, the pupil diameter lie of the laser light R at the intermediate imaging position Py also has a linear shape extending in the X direction. Since an optical magnification of the optical system 1 is larger in the Y direction than in the X direction, a pupil diameter 11d of the laser light R exiting from the exit surface 15d is formed in a circular shape as illustrated in FIG. 8.

A relationship between a first exit pupil diameter φx1 in the X direction and a second exit pupil diameter φy1 in the Y direction of the light emitted from the laser element 11, and a first projection pupil diameter φx2 in the X direction and a second projection pupil diameter φy2 in the Y direction of the light passing through the exit surface 15d of the prism 15 and reaching the projection surface 19 is as follows:

0.1<(φx1×φy1)/(φx2×φy2)<0.8. By satisfying this relationship, spot sizes at the intermediate imaging positions Px and Py increase, and an influence of dust or scratch inside the prism 15 can be effectively reduced.

Figure 9:
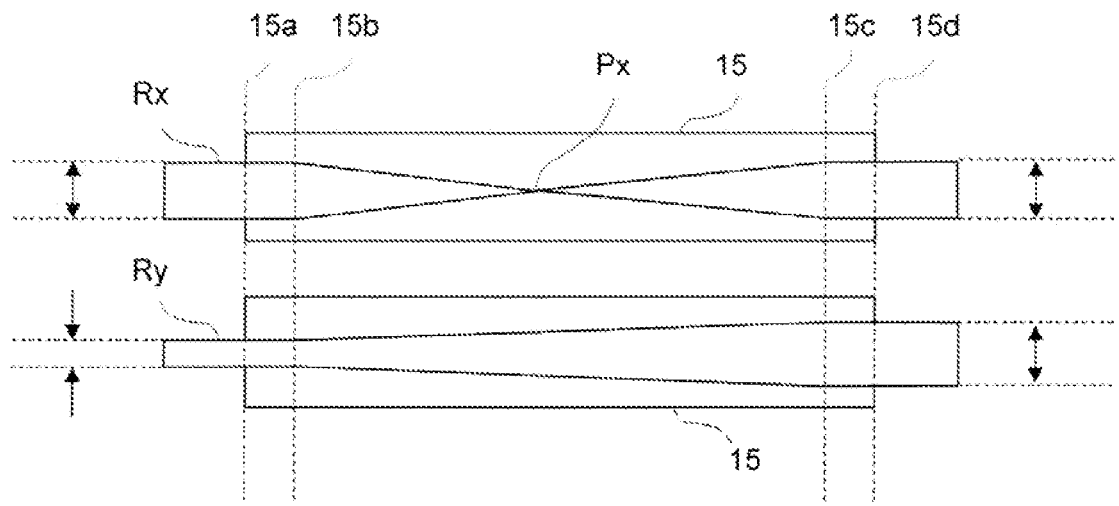
FIG. 9 is a diagram illustrating an intermediate imaging position of the X component of the laser light.

In the present embodiment, the optical system 1 has the intermediate imaging position Py in the Y direction. However, as illustrated in FIG. 9, the optical system 1 may be configured not to have an intermediate imaging action in the Y direction and there is no intermediate imaging position. Py. In this case, a curvature of the first reflecting surface 15b may be designed such that the Y component Ry of the laser light R reflected by the first reflecting surface 15b gradually increases.

The present embodiment is configured with a combination of the first scanning element 13 that is a scanner in the vertical direction and the second scanning element 17 that is a scanner in the horizontal direction. However the present embodiment may be configured with the first scanning element 13 that is a scanner in the horizontal direction and the second scanning element 17 that is a scanner in the vertical direction.

In the present embodiment, the prism 15 has two reflecting surfaces that are the first reflecting surface 15b and the second reflecting surface 15c. However, the prism 15 may have only the first reflecting surface 15b or at least two or more reflecting surfaces.

In the present embodiment, the intermediate imaging position Px is formed in the prism 15, but an optical element having a refractive power may be added in an optical path from the laser element 11 to the prism 15 to form the intermediate imaging position Rx outside the prism 15.

1-2. Effects

The optical system 1 according to the first embodiment includes the prism 15 having the incident surface 15a, the exit surface 15d, and one or more reflecting surfaces 15b and 15c. In addition, the optical system 1 includes the first scanning element 13 that scans an incident, light having a plurality of wavelengths in the first direction and reflects the light in the direction of the incident surface 15a of the prism 15, and the second scanning element 17 that scans the laser light R exiting from the exit surface 15d of the prism 15 in the Y direction orthogonal to the X direction. The incident surface 15a of the prism 15 has a concave shape with respect to the first scanning element 13. With such a configuration, when the laser light R scanned in the X direction by the first scanning element 13 is incident on the Incident surface 15a of the prism 15, the laser light R enters the prism 15 in a state close to vertical incidence with respect to the incident surface 15a. As a result, occurrence of chromatic aberration on the incident surface 15a of the prism 15 can be reduced. In addition, by passing the laser light R through the prism 15, the optical path length can be shortened by the refractive index of the prism 15 to down size the optical system 1.

The optical system 1 according to the first embodiment includes the prism 15 having the incident, surface 15a, the exit surface 15d, and one or more reflecting surfaces 15b and 15c. In addition, the optical system 1 includes the first scanning element 13 that scans an incident light having a plurality of wavelengths in the first direction and reflects the light in the direction of the incident surface 15a of the prism 15, and the second scanning element 17 that scans the laser light R exiting from the exit surface 15d of the prism 15 in the Y direction orthogonal to the X direction. The exit surface 15d of the prism 15 has a concave shape with respect to the second scanning element 17. With such a configuration, when the laser light R exits from the exit surface 15d of the prism 15 to the second scanning element 17 that scans the laser light in the Y direction, the laser light R exits from the prism 15 in a state close to vertical emission with respect to the exit surface 15d. As a result, occurrence of chromatic aberration on the exit surface 15d of the prism 15 can be reduced. In addition, by passing the laser light R through the prism 15, the optical path length can be shortened by the refractive index of the prism 15 to downsize the optical system 1.

Second Embodiment

Next, the second embodiment will be described with reference to FIG. 10.

2-1. Configuration

Figure 10:
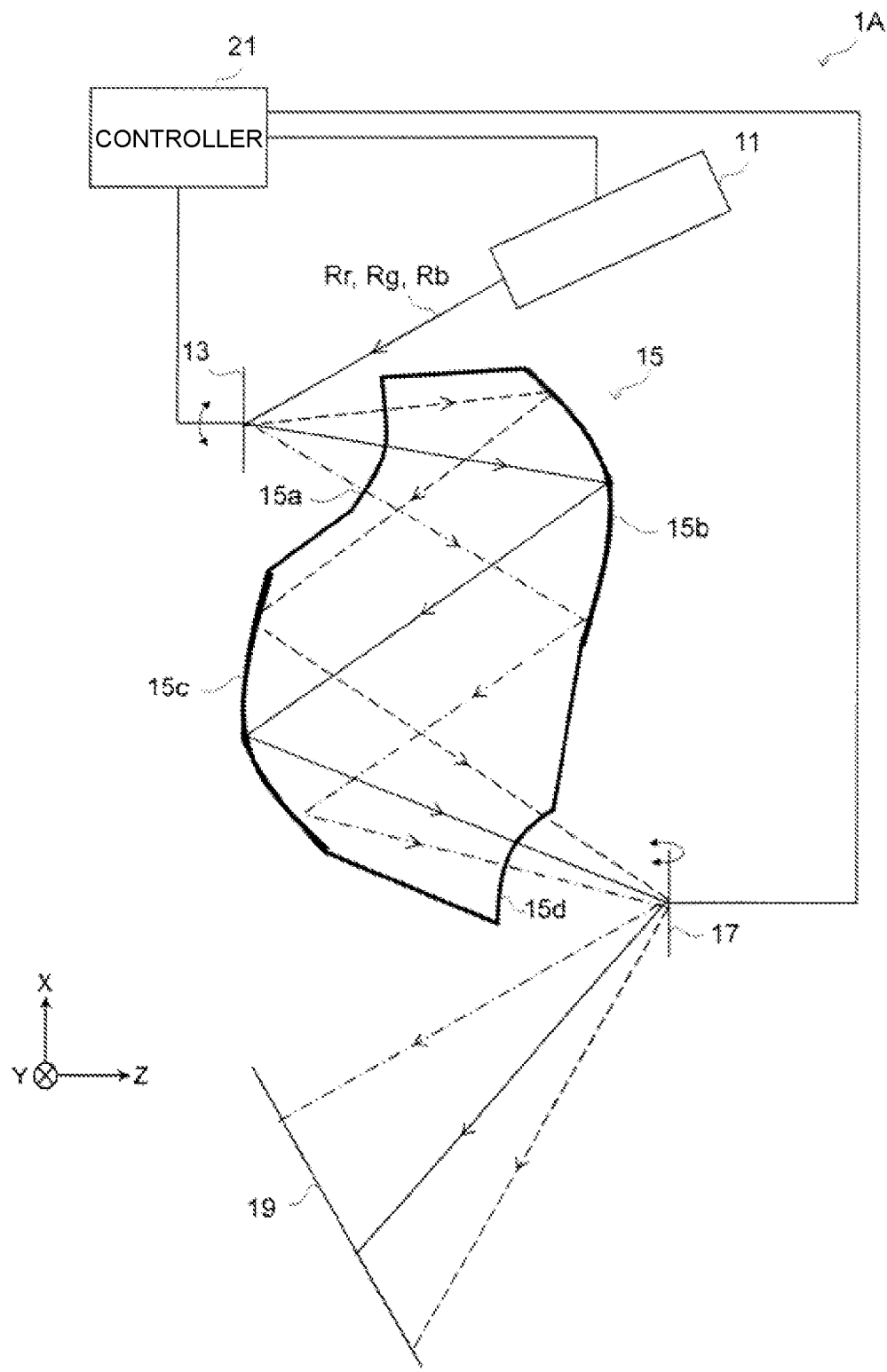
FIG. 10 is a cross-sectional view illustrating a configuration of an optical system in a second embodiment.

FIG. 10 is a diagram illustrating a configuration of an optical system 1A according to the second embodiment. As illustrated in FIG. 10, in the optical system 1A of the present embodiment, the optical system 1 of the first embodiment further includes a controller 21 that controls the laser element 11 to shift a light emission timing of the light of each wavelength for each wavelength in synchronization with scanning by the first scanning element 13 and the second scanning element 17. The configuration other than these differences is common between the optical system 1 according to the first embodiment and the optical system 1A of the present embodiment.

The laser element 11 sequentially emits laser lights Rr, Rg, and Rb of R, G, and B light fluxes at different timings. The controller 21 controls emission timings of the laser lights Rr, Rg, and Rb of respective colors in synchronization with scanning timings of the first scanning element 13 and the second scanning element 17. As a result, it is possible to further reduce deviation of an image projected on the projection surface 19 due to chromatic aberration.

Controller 21 can be implemented by a semiconductor element or the like. The controller 21 can be configured with, for example, a microcomputer, a CPU, an MPU, a GPU, a DSP, an FPGA, or an ASIC. A function of the controller 21 may be configured only by hardware, or may be realized by combining hardware and software. The controller 21 includes a storage such as a hard disk (HDD), an SSD, and a memory, and realizes a predetermined function by reading data and programs stored in the storage to perform various arithmetic processing.

2-2. Effects

Since the optical system 1A including the controller 21 controls the emission timings of the laser lights Rr, Rg, and Rb of the respective colors according to the scanning timings of the first scanning element 13 and the second scanning element 17, it is possible to correct deviation of an image projected on the projection surface 19 due to chromatic aberration.

OTHER EMBODIMENTS

As described above, the first and second embodiments have been described as examples of the technique disclosed in the present disclosure. However, the technique in the present disclosure is not limited thereto, and can also be applied to embodiments in which changes, replacements, additions, omissions, and the like are made. In addition, it is also possible to combine the components described in the first and second embodiments to form a new embodiment.

Figure 11:
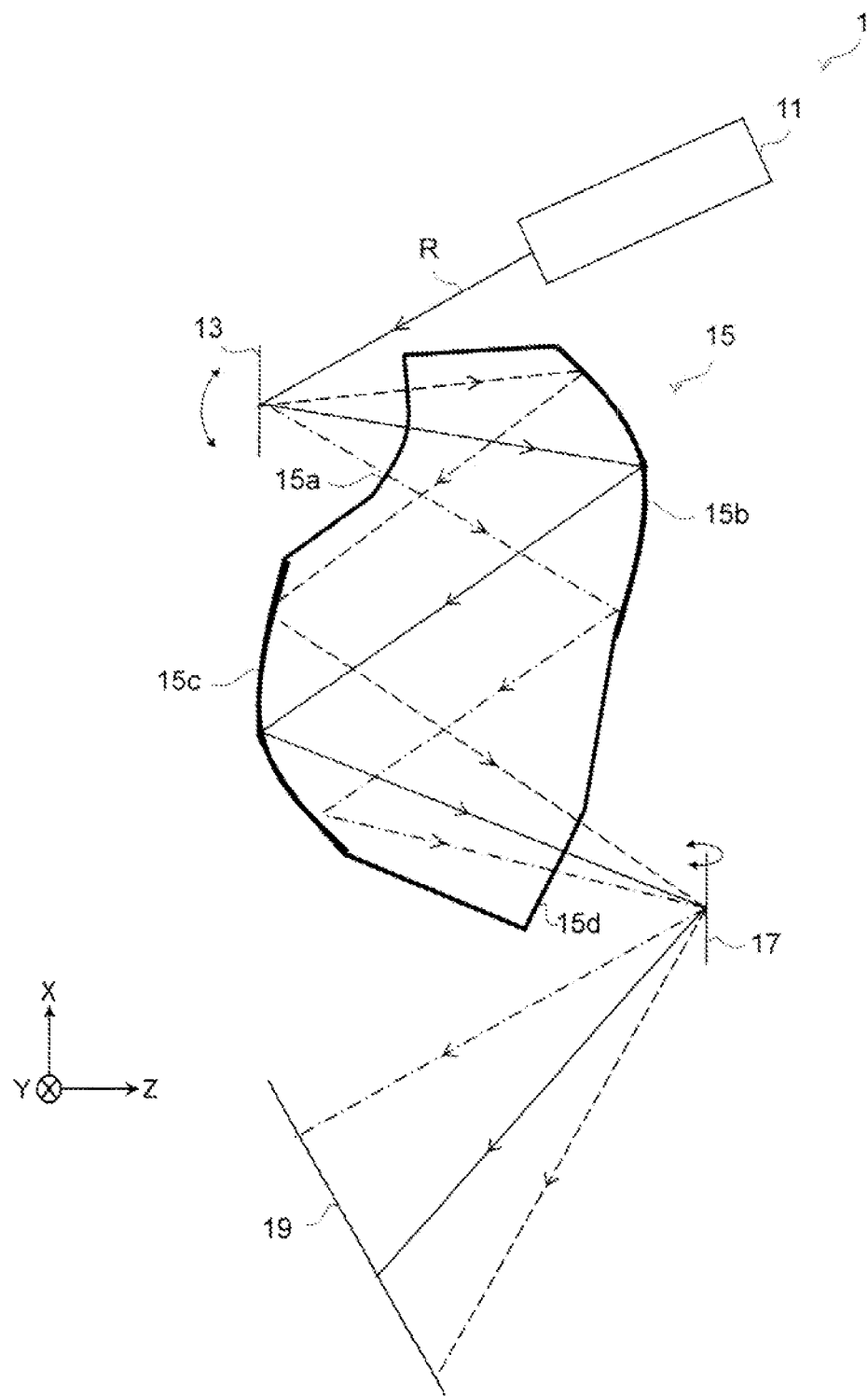
FIG. 11 is a cross-sectional view illustrating a configuration of an optical system in a modified example.

In the first and second embodiments, the exit surface 15d of the prism 15 also has the concave shape, but the present invention is not limited thereto. The exit surface 15d of the prism 15 may have a non-concave shape, for example, a flat plate shape as illustrated in FIG. 11. In this manner, only the incident surface 15a of the prism 15 may have a concave shape with respect to the scanning direction of the first scanning element 13. Conversely, only the exit surface 15d of the prism 15 may have a concave shape with respect to the scanning direction of the second scanning element 17. In this case, the incident surface 15a of the prism 15 may have a non-concave shape, for example, a flat plate shape.

As described above, the embodiments have been described as examples of the technique in the present disclosure. For this purpose, the accompanying drawings and the detailed description have been provided. Therefore, the components described in the accompanying drawings and the detailed description may include not only components essential for solving the problem but also components that are not essential for solving the problem in order to illustrate the above technique. Therefore, it should not be immediately recognized that these non-essential components are essential based on the fact that these non-essential components are described in the accompanying drawings and the detailed description.

In addition, since the above-described embodiments are intended to illustrate the technique in the present disclosure, various changes, replacements, additions, omissions, and the like can be made within the scope of the claims or equivalents thereof.

Outline of Embodiments (1) An optical system according to the present disclosure includes a prism having an incident surface, an exit surface, and one or more reflecting surfaces, a first scanning element that scans an incident light having a plurality of wavelengths in a first direction and reflects the light in a direction of the incident surface of the prism, and a second scanning element that scans the light exiting from the exit surface of the prism in a second direction orthogonal to the first direction. The incident surface of the prism has a concave shape with respect to the first scanning element.

As described above, since the incident surface of the prism has the concave shape with respect to the first scanning element, when the light scanned in the first direction by the first scanning element is incident on the incident surface of the prism, the light is incident on the prism in a state close to vertical incidence with respect to the incident surface. As a result, occurrence of chromatic aberration on the incident surface of the prism can be reduced.

(2) In the optical system according to (1), the incident surface of the prism is a rotationally asymmetric surface having a concave shape with respect to the first direction in which the first scanning element scans.

(3) In the optical system according to (1) or (2), the incident surface of the prism has a smaller refractive power in a non-scanning direction than in the first direction in which the first scanning element scans.

(4) In the optical systems according to any one of (1) to (3), a first intermediate imaging position of a light flux of a light in the first direction is located in an optical path between the first scanning element and the second scanning element.

(5) In the optical system according to any one of (1) to (4), the first intermediate imaging position of the light flux of the light in the first direction is located inside the prism.

(6) In the optical system according to (5), the first intermediate imaging position is different from a second intermediate imaging position of the light flux of the light in the second direction orthogonal to the first direction. As described above, in the prism, since the first intermediate imaging position of the light flux in the first direction is not located at the second intermediate imaging position of the light flux in the second direction, even when there is a scratch or dust in a part of the first intermediate imaging position of the light flux in the first direction in the prism, an influence on the light flux in the first direction can be reduced.

(7) In the optical system according to (5), an intermediate image is not formed with respect to the light flux of the light in the second direction orthogonal to the first direction. As described above, in the prism, since the intermediate imaging position of the light flux in the first direction is not located at the intermediate imaging position of the light flux in the second direction, even when there is a scratch or dust in a part of the intermediate imaging position of the light flux in the first direction in the prism, an influence on the light flux in the first direction can be reduced.

(8) In the optical system according to any one of (1) to (7), the exit surface of the prism has a concave shape with respect to the second scanning element.

(9) In the optical system according to (8), the exit surface of the prism is a rotationally asymmetric surface having the concave shape with respect to the second direction in which the second scanning element scans.

(10) In the optical system according to (8) or (9), the exit surface of the prism has smaller refractive power in the non-scanning direction than in the second direction in which the second scanning element scans.

(11) The optical system according to any one of (1) to (10) includes a laser element that emits a laser light as the light to the first scanning element.

(12) An optical system according to (11) includes a controller that controls the laser element to shift a light emission timing of the light of each wavelength for each wavelength in synchronization with scanning by the first scanning element and the second scanning element. As a result, it is possible to correct deviation of an image projected on the projection surface, due to chromatic aberration, by the light scanned by the second scanning element.

(13) Further, an optical, system according to the present disclosure includes a prism having an incident surface, an exit surface, and one or more reflecting surfaces, a first scanning element that scans an incident light having a plurality of wavelengths in a first direction and reflects the light in a direction of the incident surface of the prism, and a second scanning element that scans the light exiting from the exit surface of the prism in a second direction orthogonal to the first direction. The exit surface of the prism has a concave shape with respect to the second scanning element.

As described above, since the exit surface of the prism has the concave shape with respect to the second scanning element, when the light exits from the exit surface of the prism to the second scanning element that scans the light in the second direction, the light exits from the prism in a state close to vertical emission with respect to the exit surface. As a result, occurrence of chromatic aberration on the exit surface of the prism can be reduced.

(14) In the optical system according to (13), the exit surface of the prism is a rotationally asymmetric surface having a concave shape with respect to the second direction in which the second scanning element scans.

(15) In the optical system according to (13) or (14), the exit surface of the prism has a smaller refractive power in a non-scanning direction than in the second direction in which the second scanning element scans.

(16) In the optical systems according to any one of (13) to (15), a first intermediate imaging position of a Light flux of the light in the first direction is located in an optical path between the first scanning element and the second scanning element.

(17) In the optical system according to any one of (13) to (16), the first intermediate imaging position of the light flux of the light in the first direction is located inside the prism.

(18) In the optical system according to (17), the first intermediate imaging position is different from a second intermediate imaging position of the light flux of the light in the second direction orthogonal to the first direction.

(19) In the optical system according to (17), an intermediate image is not formed with respect to the light flux of the light in the second direction orthogonal to the first direction.

(20) The optical system according to any one of (13) to (19) includes a laser element that emits a laser light as the light to the first scanning element.

(21) The optical system according to (20) includes a controller that controls the laser element to shift a light emission timing of the light of each wavelength for each wavelength in synchronization with scanning by the first scanning element and the second scanning element. As a result, it is possible to correct deviation of an image projected on the projection surface, due to chromatic aberration, by the light scanned by the second scanning element.

The present disclosure is applicable to an optical apparatus employing a refractive optical system such as a prism.

EXPLANATIONS OF LETTERS OR NUMERALS

1 Optical system
11 Laser element
11a Pupil diameter
13 First scanning element
15 Prism
15a Incident surface
15b First reflecting surface
15c Second reflecting surface
15d Exit surface
17 Second scanning element
19 Projection surface
21 Controller

The invention claimed is:
1. An optical system comprising:
a prism having an incident surface, an exit surface, and one or more reflecting surfaces;
a first scanning element configured to scan a light that enters and has a plurality of wavelengths in a first direction, and reflect the light in a direction of the incident surface of the prism; and
a second scanning element configured to scan in a second direction the light that exits from the exit surface of the prism, the second direction being orthogonal to the first direction, wherein
the incident surface of the prism has a concave shape with respect to the first scanning element.
2. The optical system according to claim 1, wherein
the incident surface of the prism is a rotationally asymmetric surface having a concave shape with respect to the first direction in which the first scanning element scans.
3. The optical system according to claim 1, wherein
the incident surface of the prism has a smaller refractive power in a non-scanning direction than in the first direction in which the first scanning element scans.
4. The optical system according to claim 1, wherein
a first, intermediate imaging position of a light flux of the light in the first direction is located in an optical path between the first scanning element and the second scanning element.
5. The optical system according to claim 1, wherein
a first intermediate imaging position of a light flux of the light in the first direction is located inside the prism.
6. The optical system according to claim 5, wherein
the first intermediate imaging position is different from a second intermediate imaging position of the light flux of the light in the second direction orthogonal to the first direction.
7. The optical system according to claim 5, wherein
an intermediate image is not formed with respect to the light flux of the light in the second direction orthogonal to the first direction.
8. The optical system according to claim 1, wherein
the exit surface of the prism has a concave shape with respect to the second scanning element.
9. The optical system according to claim 8, wherein
the exit surface of the prism is a rotationally asymmetric surface having a concave shape with respect to the second direction in which the second scanning element scans.
10. The optical system according to claim 8, wherein
the exit surface of the prism has a smaller refractive power in a non-scanning direction than in the second direction in which the second scanning element scans.
11. The optical system according to claim 1, comprising:
a laser element configured to emit a laser light as the light to the first scanning element.
12. The optical system according to claim 11, comprising:
a controller configured to control the laser element to shift a light emission timing of the light of each wavelength for each of the plurality of wavelengths in synchronization with scanning by the first scanning element and the second scanning element.

13. An optical system comprising:

a prism having an incident surface, an exit surface, and one or more reflecting surfaces;

a first scanning element configured to scan in a first direction a light that enters and has a plurality of wavelengths, and reflect the light in a direction of the incident surface of the prism; and a second scanning element configured to scan in a second direction the light that exits from the exit surface of the prism, the second direction being orthogonal to the first direction, wherein the exit surface of the prism has a concave shape with respect to the second scanning element.

14. The optical system according to claim 13, wherein the exit surface of the prism is a rotationally asymmetric surface having a concave shape with respect to the second direction in which the second scanning element scans.

15. The optical system according to claim 13, wherein the exit surface of the prism has a smaller refractive power in a non-scanning direction than in the second direction in which the second scanning element scans.

16. The optical system according to claim 13, wherein a first intermediate imaging position of a light flux of the light in the first direction is located in an optical path between the first scanning element and the second scanning element.

17. The optical system according to claim 13, wherein a first intermediate imaging position of a light flux of the light in the first direction is located inside the prism.

18. The optical system according to claim 17, wherein the first intermediate imaging position is different from a second intermediate imaging position of the light flux of the light in the second direction orthogonal to the first direction.

19. The optical system according to claim 17, wherein an intermediate image is not formed with respect to the light flux of the light in the second direction orthogonal to the first direction.

20. The optical system according to claim 13, comprising:
a laser element configured to emit a laser light as the light to the first scanning element.

21. The optical system according to claim 20, comprising:
a controller configured to control the laser element to shift a light emission timing of the light of each wavelength for each of the plurality of wavelengths in synchronization with scanning by the first scanning element and the second scanning element.

* * * * *